2,938,202

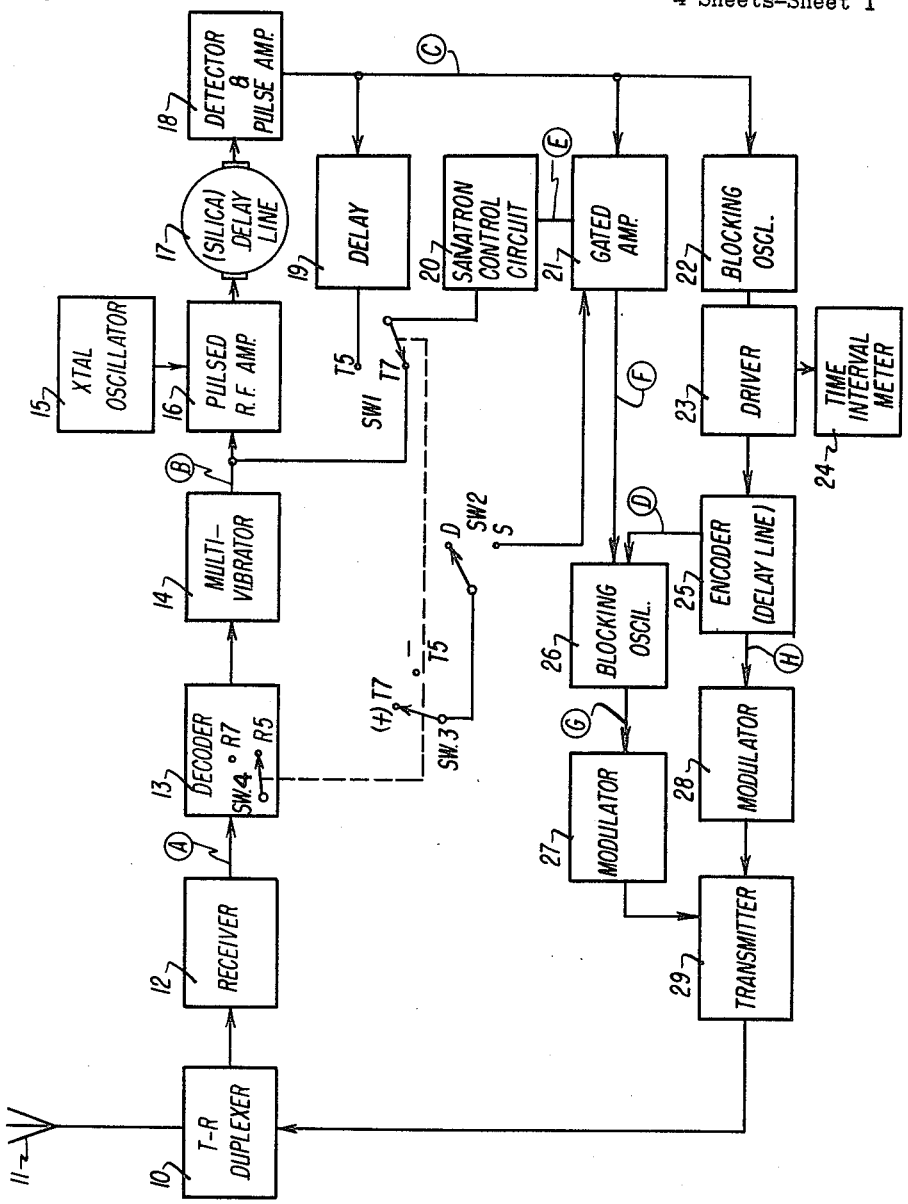

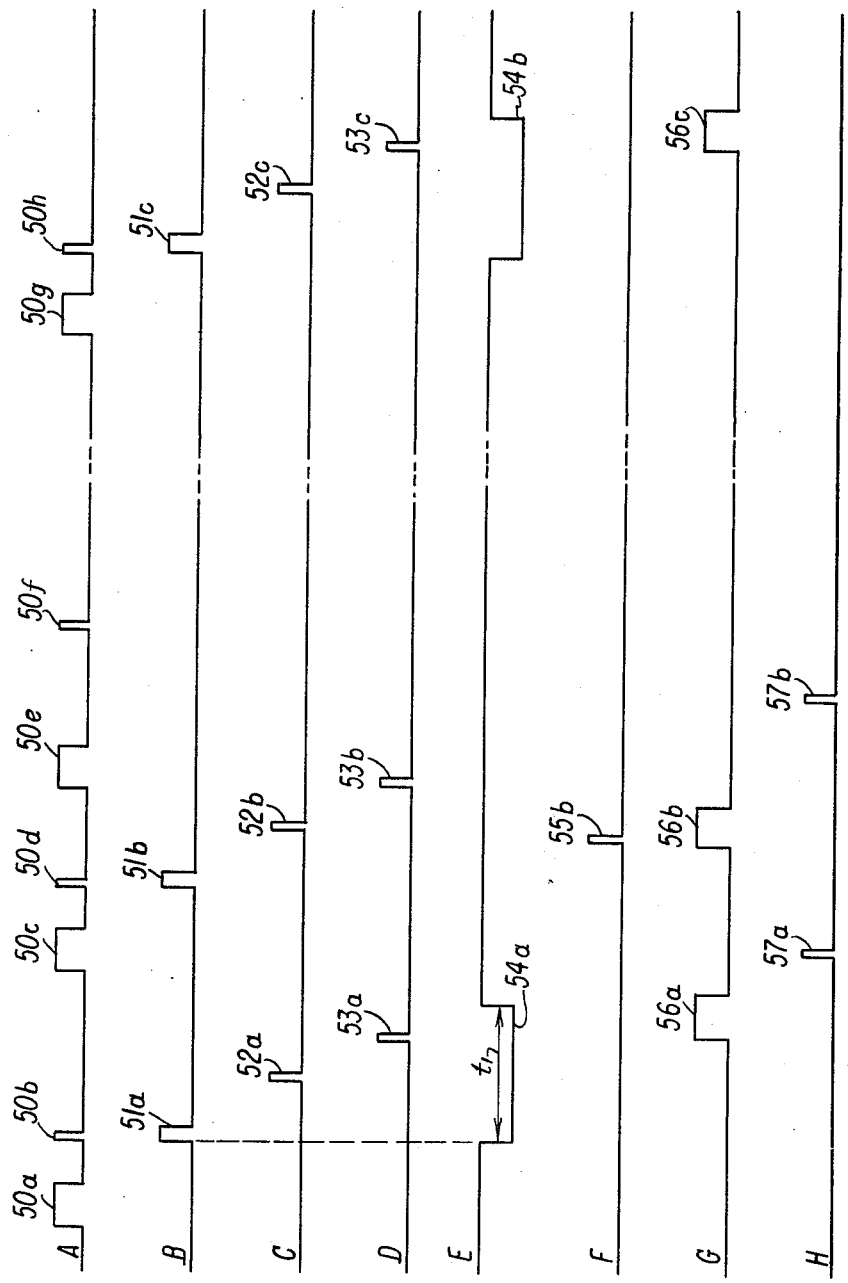

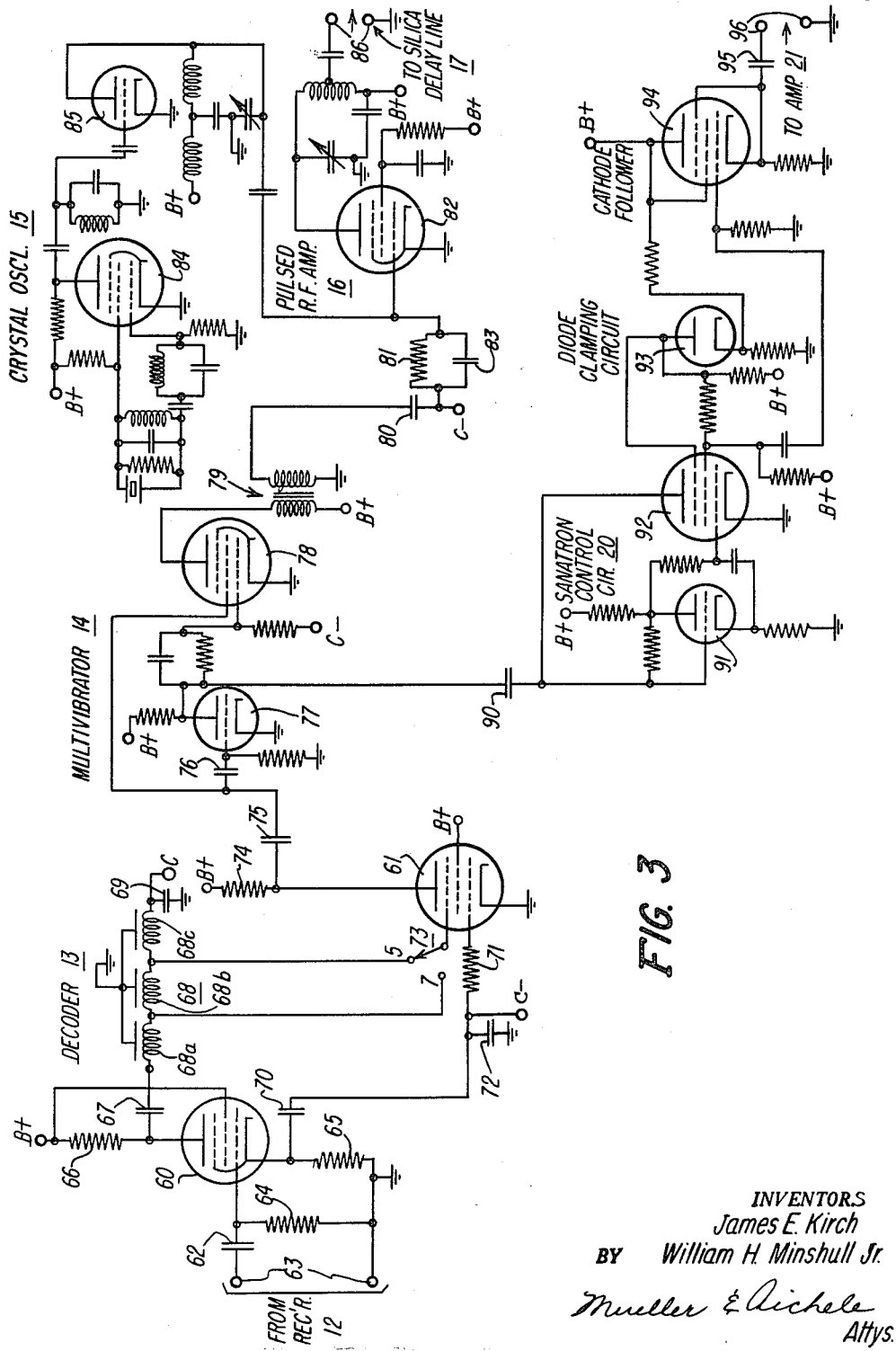

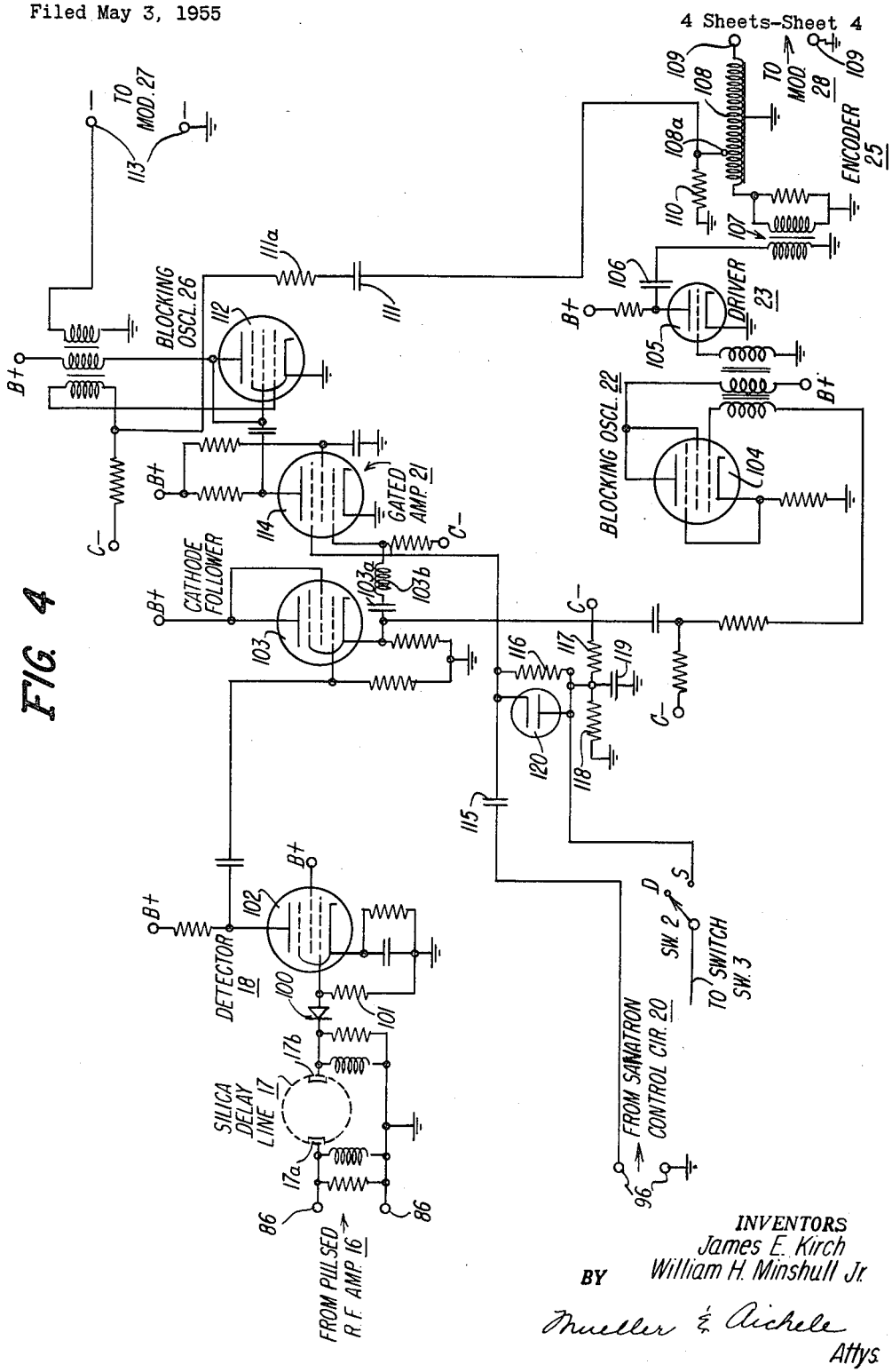

DISTANCE MEASURING APPARATUS

James E. Kirch, Elmhurst, Ill., and William H. Minshull, Jr., Santa Monica, Calif., assignors to Motorola, Inc., Chicago, Ill., a corporation of Illinois Filed May 3, 1955, Ser. No. 505,788

8 Claims. (Cl. 343—7.5)

The invention covered herein may be manufactured and used by or for the government of the United States for governmental, military, naval and national defense purposes without payment to me or my assigns of any royalties thereon.

This invention relates to distance measuring systems, and more particularly to systems for measuring radio line-of-sight distances with a high degree of precision and accuracy.

Radio distance measuring systems are known to the art. One particular type is referred to as the "meaconing" system. In the meaconing system, in order to determine the distance between a pair of stations "A" and "B," each is made to trigger the other so as to establish a repetition period inversely proportional to the distance between them, this repetition period being recorded by means of a suitable pulse counter from which the desired distance measurement can be calculated. In other words, station "A" sends out a pulse that is received by station "B" and the pulse is then re-transmitted by station "B" back to station "A." Station "A" receives the re-transmitted pulse and sends it back to station "B," and so on. The rate at which the pulse leaves station "A" is, then, a measure of the distance between the stations.

In the meaconing system, the circulated pulse undergoes a delay at station "A" between the receiver and transmitter of that station, and the pulse undergoes a similar delay at station "B." These delays must be known and held constant for an accurate distance measurement, since it is necessary in this type of system to subtract the delays from the readings of the total system repetition period or else they will introduce errors in the calculation of the true distance between the stations. However, these delays are difficult to measure or calculate accurately or maintain constant over any length of time, so that the precision of the meaconing system is limited.

One object of the present invention is to provide an improved radio system of the general "meaconing" type described above for measuring the distance between two stations and which is so constructed that delays at each station algebraically cancel themselves, so that there is no need to know what these delays are or to maintain them constant over any appreciable time interval.

A feature of the invention is the provision of a meaconing radio distance measuring system of the type described above in which the pulse circulated between the two stations travels in a single traverse for one set of readings corresponding to a selected number of cycles of the pulse in a manner similar to the traverse in the meaconing system, and in which the pulse is then made to circulate each station a number of times before being transmitted to the other station for a similar number of recorded cycles in a "plural traverse" manner; the two sets of readings being subtracted from one another. It can be shown that the actual one-way air time of the pulse between the stations, without any error being introduced due to station delays, corresponds to the difference between the two sets of readings.

The above statement can be illustrated mathematically as follows:

Assume first that both stations are set to operate in the single traverse condition, and that 10,000 pulse intervals are timed in this condition, a "pulse interval" being defined as the total time for a pulse to traverse completely the system. Then the total single traverse time $(T_s)$ will be:

$$T_s = (t_1 + t_2 + 2t_a) 10^4$$

where:

$t_1$—traverse time or delay in station "A"
$t_2$—traverse time or delay in station "B"
$t_a$—air time (one way)

Assume next that both stations are operating in the double traverse condition described above, and that 5,000 pulse intervals are timed. Then the total double traverse time $(T_d)$ will be:

$$T_d = (2t_1 + 2t_2 + 2t_a) 10^4 / 2$$
$$= (t_1 + t_2 + t_a) 10^4$$

Now, if we subtract the total double traverse time $(T_d)$ from the single traverse time $(T_s)$, we get:

$$\frac{(T_s - T_d)}{10^4} = (t_1 + t_2 + 2t_a) - (t_1 + t_2 + t_a)$$
$$= t_a$$

Thus, the air time without station traverse time errors is obtained merely by subtracting the double traverse readings from the single traverse readings. This provides a highly accurate means for measuring the distance between the stations without the need for a knowledge of the exact value of the delay at either station, nor a requirement that these delays be kept constant longer than the time required to take a set of single traverse readings and a set of double traverse readings.

It is, accordingly, a general object of the present invention to provide an improved method for determining the distance between a first and a second station by means of a radio system, and which method determines the distance to a high degree of precision and reduces errors introduced in prior art systems of this general type.

The further object of the invention is to provide such a method which may be carried out in a relatively simple and expeditious manner.

Yet another object of the invention is to provide suitable apparatus for practicing the method of the invention.

A feature of the invention is the provision of an improved system and method for determining the distance between a pair of stations by reciprocating a pulse between the stations, which method comprises causing the pulse to circulate once at each station for a first set of "single traverse" readings, and comprises causing the pulse to circulate twice at each station for a similar set of "double traverse" readings, so as to determine the true distance between the stations and automatically cancel errors due to delays at the individual stations.

Yet another feature of the invention is the provision of suitable apparatus for use in the above system and which functions automatically for the double traverse readings to circulate the pulse twice at each station before it is transmitted to the other station for distance measuring purposes.

The above and other features of the invention which are believed to be new are set forth with particularity in the appended claims. The invention itself, however, together with further objects and advantages thereof may best be understood by reference to the accompanying drawing in which:

Fig. 1 shows the apparatus at either one of the stations of the invention and is a block representation of apparatus for carrying out the invention;

Fig. 2 is a series of curves useful in understanding the invention; and

Figs. 3 and 4 are detailed diagrams of suitable circuits for use in the system of Fig. 1.

The present invention provides a method and apparatus for measuring the distance between a first station and a second station. This is accomplished by measuring the time for an electrical pulse to travel between the station and which pulse is subject to incidental delays at each of the stations.

The method of the invention includes timing a selected number of cycles of the following steps, receiving the pulse at the second station, circulating the pulse once through the second station, transmitting the pulse from the second station to the first station, receiving the pulse at the first station, circulating the pulse once through the first station, and transmitting the pulse from the first station to the second station. The method also includes timing a number of cycles of the following steps, receiving the pulse at the second station, circulating the pulse a number of times through the second station, transmitting the pulse from the second station to the first station, receiving the pulse at the first station, circulating the pulse a number of times through the first station, and then transmitting the pulse from the first station to the second station.

The apparatus shown in Fig. 1 can be used in either of the two stations referred to previously. The apparatus includes a transmit-receive duplexer 10 of well known construction, and which is connected to an antenna 11 to enable the same antenna to be used for receiving and transmitting. Duplexer 10 is connected to a receiver 12 which may be of any known construction which receives and detects the energy intercepted by the antenna 11. Receiver 12 is, in turn, connected to a decoder 13, the decoder being adapted to be set by a switch SW4 to accept either one of two coding modes with which the signal received by the antenna 11 is coded. These coding modes will be conveniently designated herein as a "5-code" mode or a "7-code" mode.

Decoder 13 is connected to a multivibrator 14 which, in turn, is coupled through a pulsed radio frequency amplifier 16 to a delay line 17. A crystal oscillator 15 is connected to the amplifier 16, so that bursts of oscillation from the oscillator are impressed on delay line 17 whenever the amplifier 16 is pulsed by pulses from multivibrator 14.

The delayed bursts from delay line 17 are detected and amplified in unit 18; and the output terminal of unit 18 is connected to a delay line 19, to a gated amplifier 21 and to a blocking oscillator 22. Delay line 19 is connected to a contact T5 of a switch SW1; the switch having a contact T7 connected to the output terminal of multivibrator 14, and the switch having a movable arm connected to a sanatron control circuit 20 which, in turn, is connected to gated amplifier 21.

Gated amplifier 21 has a further input terminal connected to the contact S of a switch SW2, this switch having a further contact D which is open, and having a movable arm which is connected to the movable arm of a switch SW3. The switch SW3 has one contact connected to the positive terminal of a source of unidirectional potential and a second contact connected to the negative terminal of such a source. Switches SW1, SW3 and SW4 may be mechanically interconnected for unicontrol.

Gated amplifier 21 also has an output terminal connected to a blocking oscillator 26 which, in turn, is connected to a modulator 27. Blocking oscillator 22, on the other hand, is connected through a driver stage 23 to an encoder 25 which is in the form of a delay line. Encoder 25 has an intermediate terminal connected to blocking oscillator 26, and has an output terminal connected to a modulator 28. Modulators 27 and 28 are both connected to a transmitting means 29 which, in turn, is connected to the duplexer 10. A time interval meter 24 of any known construction is connected to the driver 23 to record the cycles of pulse translation through the system so that sets of double traverse and single traverse readings can be taken.

The operation of the apparatus of Fig. 1 can best be understood by considering that diagram in conjunction with the curves of Fig. 2. However, before referring expressly to Fig. 2, a brief review of the operation of the system will be made. As previously set forth, the system includes two stations each of which may incorporate the apparatus shown in Fig. 1. One of the stations is set to receive the 5-code mode and the other is set to receive the 7-code mode. These different codes comprise a signal made up of a keying pulse and a timing pulse. The timing pulse has the same timing for either the 5-code mode or the 7-code mode, but the timing of the keying pulse is varied so that it has a first selected timing with the timing pulse in the 5-code mode and a different selected timing in the 7-code mode.

The system is so arranged that the first station transmits the 7-code mode which is received by the second station and the timing pulse thereof is accepted by the decoder of the second station. This timing pulse is circulated through the second station and a keying pulse is added thereto still in the 7-code mode, so that the second station again accepts the timing pulse and circulates it once again. Even though the timing and keying pulses are transmitted during this first circulation at the second station, they are rejected by the first station since its decoder is set to accept the timing pulse only during the 5-code mode. The timing pulse then circulates the second station once agin, and at the completion of this second circulation a keying pulse is added thereto in the 5-code mode. The timing pulse of the 5-code mode transmitted signal is then rejected by the second station but accepted by the decoder of the first station. By a similar operation at the first station, the timing pulse circulates the first station twice in the 5-code mode and at the completion of the second circulation is transmitted to the second station as a 7-code mode which is accepted by the second station. This operation will be referred to as "double traverse" operation and the timing pulse is allowed to reciprocate back and forth between the two stations, taking a double circulation at each station, for a selected number of cycles which are timed and the time reading for this selected number of cycles is recorded.

The system is then operated in "single traverse" in which each station transmits one code and is set to receive the other. That is, the first station is set to transmit 7-code and to receive 5-code, while the second station is set to transmit 5-code and receive 7-code. This causes each pulse to traverse each station but once, and then be accepted by the second station. A number of cycles in this "single traverse" operation corresponding to twice the number for double traverse are then timed, and the timing for double traverse is subtracted from the timing for single traverse in the previously described manner so as to obtain a determination of the precise distance between the stations without errors being introduced due to delays at the two stations.

Returning now to the system of Fig. 1 which is set for double traverse operation, and to receive the 5-code mode but to transmit alternately the 5-code mode and the 7-code mode. In any double traverse cycle of the reciprocated pulse signal, the receiver 12 receives a burst of energy corresponding to the 5-code mode and detects that burst. There then appears at the output terminal of the receiver a keying pulse 50a shown in curve A of Fig. 2 followed by a timing pulse 50b, with a selected first mode timing between the keying pulse and the timing pulse. Decoder 13 is set to R5 so that it will translate the timing pulse only when the coded pulse signal detected by the receiver is in accordance with the 5-code mode. A pulse 51a appears therefore at the output of multivibrator 14 corresponding to the timing pulse 51a translated by the decoder 13 which triggers the multivibrator.

It is desired to introduce a precise unvariable delay into the pulse 51a from multivibrator 14, and this can best be achieved by means of a vitreous silica delay line 17. Delay line 17 is in the form of a polygon and has a pair of suitable transducers associated therewith. This delay line responds only to bursts of energy, and for that reason, stabilized crystal oscillator 15 is provided which may include a frequency doubler to provide, for example, a 30-megacycle signal which is impressed on amplifier 16. Amplifier 16 is actuated by the pulse 51a from the multivibrator, and this pulse causes the amplifier to impress a burst of energy on delay line 17 to be delayed a selected interval thereby. The delayed burst from the delay line 17 is detected and amplified in unit 18 to produce the delayed pulse 52a of curve C of Fig. 2. The pulse 52a is impressed on blocking oscillator 22 and through driver 23 to the encoder delay line 25. Encoder 25 delays the pulses from blocking oscillator 22 to produce at an intermediate point thereon, pulse 53a of curve D of Fig. 2. This latter pulse is impressed on blocking oscillator 26.

At the same time, the pulse 51a from multivibrator 14 is impressed through switch SW1 on the sanatron control circuit 20. This causes the control circuit to produce a control pulse 54a in curve E of Fig. 2, which pulse continues a certain time $t_1$ after the termination of keying pulse 51a, as determined by the setting of the control circuit. The pulse 54a is impressed on gated amplifier 21 and causes that amplifier to block the pulse 52a of curve C from the blocking oscillator 26. Therefore, the blocking ocsillator 26 is triggered by the delayed pulse 53a from encoder 25 to produce a keying pulse 56a of curve 2g, which keying pulse is impressed on modulator 27 so that it may modulate a suitable carrier in transmitter 29.

During this time, the pulse 52a of curve C is fully delayed by the delay line in the encoder 25 to produce the timing pulse 57a of curve H. The timing pulse 57a is supplied to modulator 28 so that the carrier in transmitter 29 may also be modulated by the timing pulse 57a.

The carrier, therefore, is modulated with the keying pulse 56a of curve 2g and to the timing pulse 57a of curve 2h. The timing between these two pulses is made to correspond to the 5-code mode, as was the timing between the received pulses 50a and 50b. The combination of the pulses 56a, 57a is rejected by the other station, which is set to accept only the 7-code mode, but the pulses are received by the receiver of the station under consideration, and decoder 13 accepts the timing pulse since the decoder is set to the 5-code mode. In response to the last transmission, receiver 12 produces a pair of pulses 50c and 50d having the 5-code mode timing, and decoder 13 accepts the timing pulse 50d to cause multivibrator 14 to produce the timing pulse 51b of curve B. By the action similar to the last traverse or circulation, detector 18 produces a delayed pulse 52b shown in curve C, and the last pulse is impressed on blocking oscillator 22 to appear at the intermediate point encoder 25 as delayed pulse 53b of curve D to be impressed on blocking oscillator 26. However, the pulse 52b of curve C is also impressed on gated amplifier 21 which now is open due to the termination of pulse 54a from the sanatron control circuit 60 so as to translate a pulse 55b as shown in curve F. The latter pulse corresponds in timing to pulse 52b and precedes delayed pulse 53b. Therefore, pulse 55b triggers the blocking oscillator 26 prior to the pulse 53b, and the blocking oscillator does not have time to recover when the pulse 53b comes along so that the blocking oscillator is unresponsive to the latter pulse. Blocking oscillator 26 is therefore triggered earlier than in the preceding instance, and it generates a keying pulse 56b which is applied to modulator 27 so that the carrier in transmitter 29 may be modulated thereby. As before, the timing pulse travels down the delay line of encoder 25 to be impressed on modulator 28 as pulse 57b.

The carrier of transmitter 29 is now modulated in accordance with the 7-code mode due to the change in timing of the keying pulse 56b. Therefore, the signal detected by receiver 12 due to the latter transmission consists of a keying pulse 50e followed by a timing pulse 50f. The 7-code mode timing between the pulses 50e and 50f is such that both are rejected by decoder 13 which is set to accept the timing pulses for the 5-code mode only. However, the 7-code signal is accepted by the decoder of the other station, so that the timing pulse circulates around the other station, is first transmitted with a 7-code which is rejected by the first station for double traverse at the second station, and is then transmitted with a 5-code including the pulses 50g and 50h. Timing pulse 50h is accepted by decoder 13 for the second cycle which derives the timing pulse 51c of curve B. This pulse causes detector 18 to produce the delayed timing pulse 52c of curve C which, in turn, produces the pulse 53c at the intermediate point on the delay line of encoder 25, the latter pulse triggering blocking oscillator 26 due to the fact that gated amplifier 20 is now closed by pulse 54b from control circuit 20, so that a keying pulse 56c for 5-code mode is produced by blocking oscillator 26.

Transmitter 29, therefore, transmits in alternation the 5-code mode and the 7-code mode. This causes the timing pulse to be circulated twice around the station before it is transmitted and accepted by the other station. It is to be noted that all the variable timing variations are imparted to the keying pulse, and not to the timing pulse. In this way, the timing of the latter can be precisely controlled in accurate delay circuits to which no variable control is imparted.

To condition the apparatus of Fig. 1 for receiving the 7-code, it is merely necessary to change the illustrated control SW4 of decoder 13 from R5 to R7. When switch SW1 is changed from contact 7 to contact 5, delayed pulses from detector 18 received through delay line 19 are used to actuate control circuit 20, and this causes the transmitter to transmit the 7-code and 5-code in the proper sequence for double traverse operation when the decoder is so set to R7.

As noted, a series of single traverse readings are also taken, and for these readings it is merely necessary to place the movable arm of switch SW2 at the S contact. Then, if the movable arm SW3 is placed to contact T7, gated amplifier 21 has a positive voltage impressed thereon so that it passes the pulses from curve C and the blocking oscillator 26 is actuated in the 7-code mode by the pulses of curve F. On the other hand, for 5-code mode on the single traverse, switch SW3 is set to contact T5. This impresses a negative voltage on gated amplifier 21 holding the gate closed, and causing the blocking oscillator to be triggered in the 5-code mode timing by the pulses of curve D from the intermediate point of the encoder of delay line 25.

An appropriate record for each set of readings may be made by time interval timer 24. This timer is of any well known type which will automatically count up to a predetermined number of cycles and then automatically stop providing a timing indication for that number of cycles. The timer, for example, may be set to count 10,000 cycles of single traverse and 5,000 cycles of double traverse for the previously described reasons.

Some of block components of the system of Fig. 1 are shown in circuit detail in Figs. 3 and 4. The other block components, such as the duplexer 10, receiver 12, modulators 27 and 28 and transmitter 29, are believed to be so well known to the art that a detailed description of the actual circuitry used therein is unnecessary.

Referring now to Fig. 3, decoder 13 may incorporate a pair of electron discharge devices 60 and 61. Device 60 has a control electrode coupled through a capacitor 62 to one of a pair of input terminals 63, the other input terminal being connected to a point of reference potential or ground. The control electrode of device 60 is also connected to ground through a resistor 64, and the cathode of that device is connected to ground through a resistor 65. The screen electrode of device 60 is directly connected to the positive terminal B+ of a source of unidirectional potential, and the anode of that device is connected to the positive terminal through a load resistor 66. The suppressor electrode of device 60 is connected to the cathode.

The anode of device 60 is coupled through a capacitor 67 to the input terminal of a delay line 68. The delay line has three series-connected inductive sections 68a, 68b and 68c, and it has an output terminal connected to the negative terminal "C—" of a direct current biasing source and by-passed through a capacitor 69 to ground.

The cathode of device 60 is coupled through a capacitor 70 and limiting resistor 71 to the control electrode of device 61, the junction of capacitor 70 and resistor 71 being by-passed to ground through a capacitor 72 and being connected to the negative terminal "C—" of the biasing source. The cathode of device 61 is connected to ground, and the screen electrode is connected to the positive terminal B+. The suppressor electrode of this device is connected to the movable arm of a switch 73. This switch has a first contact numbered "5" connected to the junction of sections 68b and 68c of delay line 68, and it also has another contact numbered "7" connected to the junction of sections 68a and 68b. The anode of device 61 is connected through a load resistor 74 to the positive terminal B+ of a source of unidirectional potential. The anode is also coupled through a pair of capacitors 75 and 76 to the control electrode of an electron discharge device 77 in multivibrator 14.

When a pulse such as the keying pulse 50a of curve A of Fig. 2 is impressed on input terminals 63, this pulse is translated by device 60 and impressed on delay line 68 with negative-going polarity. The pulse is translated to the termination of the delay line and reflected back along the delay line with positive-going polarity. The keying pulse is also supplied with positive-going polarity through capacitor 70 to the control electrode of discharge device 61. This control electrode is biased negatively to a value sufficient to maintain the device 61 non-conductive even in the presence of the positive-going keying pulse.

The timing pulse 50b of curve A impressed across terminals 63 also tends to render device 61 conductive as it appears with positive-going polarity across cathode resistor 65 and is supplied to the control electrode of device 61 through capacitor 70 and resistor 71. However, device 61 actually becomes conductive only when the keying pulse as reflected back along delay line 68 and applied to the suppressor grid of device 61 through switch 73 occurs in time coincidence with the timing pulse.

The 7-code mode and 5-code mode timing between the keying pulse and the timing pulse can be so chosen that the setting of switch 73 to its 5-contact causes the 5-code keying pulse to be applied to device 61 in time coincidence with the corresponding timing pulse so that the timing pulse is translated by device 61, whereas setting of the movable arm of switch 73 to its 7-contact causes device 61 to translate the timing pulse for the 7-code mode. It is in this manner that decoder 13 can be adapted to select the timing pulse for the 5-code mode or, when so desired, to select the timing pulse for the 7-code mode, this being done by setting switch 73 to its contacts or to its contact 7.

Device 77 and several of the electrodes of a second electron discharge device 78 are connected in known manner to form the multivibrator 14. That is, the cathode, control grid and screen electrode of device 78 are included in the multivibrator circuit; the screen electrode being electron-coupled to the anode of device 78 so that the device also functions as an isolation amplifier. The circuit of devices 77 and 78 responds to the negative-going timing pulses translated by device 61 effectively to produce as the anode of device 78 the pulses of curve B of Fig. 2, which pulses have a leading edge determined by the leading edge of timing pulses 50b, 50d, 50h, etc., of curve A and have a trailing edge determined by the setting and parameters of the multivibrator.

The anode of discharge device 78 is connected to the positive terminal B+ through the primary winding of a coupling transformer 79, the secondary winding of which is connected to ground and through a coupling capacitor 80 and resistor 81 to the control electrode of an electron discharge device 82 included in the pulsed amplifier 16. The junction of capacitor 80 and resistor 81 is connected to the negative biasing terminal C—, and resistor 81 is shunted by a capacitor 83.

Crystal oscillator 15 includes an electron discharge device 84 connected in well known manner as a highly stabilized crystal oscillator. The oscillator generates, for example, a 15-megacycle oscillation and this oscillation is frequency doubled in a known frequency doubler circuit of discharge device 85. The resulting 30-megacycle oscillation is supplied, together with the pulses from device 78, to the control electrode of device 82 of the pulsed radio frequency amplifier 16. Device 82 is so biased that it produces a burst of radio frequency energy corresponding to the 30-megacycle oscillation for the duration of each positive-going pulse from device 78 of multivibrator 14. These bursts are supplied through a resonant output circuit to output terminals 86 to be impressed on the silica delay line 17.

The anode of the first device 77 in multivibrator 14 is coupled through a capacitor 90 to the control electrode of a cathode-follower device 91 in the sanatron control circuit 20 to supply negative-going pulses to the cathode follower. This control circuit also includes a discharge device 92, and these devices are connected in known manner to produce an accurately timed negative-going pulse 54a of curve E of Fig. 2 in response to the triggering thereby by the negative-going pulses from multivibrator 14. The control circuit 20 is connected through a diode clamping circuit 93 to a cathode follower isolation circuit including electron discharge device 94. The clamping circuit prevents secondary emission in device 92 which would interfere with the efficient operation of the sanatron. The cathode of device 94 is coupled through a capacitor 95 to a pair of output terminals 96 which are coupled to gated amplifier 21.

Referring now to Fig. 4, the delay line 17 includes a vitreous silica element shaped as a polygon and having a pair of electro-mechanical transducers 17a, 17b at opposite sides thereof. Transducer 17a is connected to ground through suitable impedance elements, and it is also connected to the ungrounded one of input terminals 86 from the pulsed radio frequency amplifier 16. The transducer 17b is also connected to ground through suitable impedance elements, and the latter transducer is further connected to a rectifier 100 which is connected to form the second detector 18 of Fig. 1. The detector is connected to ground through a load resistor 101, and is further connected to the control electrode of a pulse amplifier electron discharge device 102. The pulse amplifier is coupled through a cathode follower stage 103 to the blocking oscillator 22 which is connected in known manner and which includes an electron discharge device 104.

The output of blocking oscillator 22 is connected to the control electrode of an electron discharge device 105 which is connected to constitute the driver 23 of Fig. 1. The anode of device 105 is connected through a coupling capacitor 106 to the primary winding of a coupling transformer 107. The secondary winding of transformer 107 is connected to the input terminal of a delay line 108 included in the encoder 25. The output terminal of delay line 108 is connected to one of a pair of output terminals 109 the other of which is grounded, and which terminals, in turn, are coupled to modulator 28 of Fig. 1. An intermediate point on delay line 108 is connected to ground through a load resistor 110, and this point is coupled through a coupling capacitor 111 and resistor 111a to the blocking oscillator circuit of electron discharge device 112 which constitutes the blocking oscillator 26 of Fig. 1. The output of blocking oscillator 26 is connected to the output terminals 113 which are coupled to modulator 27.

The cathode follower 103 is also coupled through a capacitor 103a and inductance coil 103b to the control electrode of the electron discharge device 114 of gated amplifier 21 to impress positive-going pulses thereon. These pulses are normally translated by device 114 and trigger blocking oscillator 26. The suppressor electrode of device 114 is connected through a capacitor 115 to the sanatron control circuit 20 by way of terminals 96. In the presence of the negative-going control pulse 54a from control circuit 20, device 114 is cut off so that the pulses from device 102 are no longer translated thereby. The suppressor is connected through a resistor 116 to the common junction of a pair of resistors 117, 118 connected between the negative terminal C— and ground, resistor 118 being by-passed by a capacitor diode 120. The common junction of resistors 117, 118 is also connected to the terminal "S" of switch SW2 of Fig. 1 so that a "+" or "—" potential may be impressed on suppressor 114 for single traverse to override the sanatron pulses and either hold the gated amplifier 21 open or closed.

As previously noted, the triggering of blocking oscillator 26 by a pulse from gated amplifier 21 renders it insensitive to the pulse from the intermediate point 108a on delay line 108, since the pulse from the intermediate point is impressed on the blocking oscillator 26 before it has had time to recover from its triggering due to the pulse from gated amplifier 21.

The circuitry of Figs. 3 and 4 has been simplified for purposes of clarity. It will be evident to those skilled in the art that many refinements are possible so that the circuit may more adequately perform its intended function. However, these refinements are believed to be well within the skill of a circuit designer and it is believed unnecessary to encumber the record with such details.

As previously noted, the pulse interval timer 24 may be coupled to driver 23 in known manner. This timer may be of any known type and responds to the pulses from blocking oscillator 22 to establish a predetermined count and provide a set of readings for single or double traverse. The timer may be set automatically to turn itself off after a selected number of pulses so as to provide a time record of the repetition rate of such pulses. The timer, moreover, may be a bi-directional type which electronically controls the system so as to alternate single and double traverse for each successive path of the pulse around the system loop. Or, the timer could be employed to count up on a single traverse path and count down on a double traverse path so as to provide a direct result automatically. By this means, the short term variations are averaged out over the total counts and at the same time, any wrong and intermediate time variations are eliminated by the fact that the station traverse time is subtracted on an instantaneous basis upon each pulse loop.

The fact that the timing pulses undergo no adjustable delays enables highly precise fixed delay elements to be used that can be relied upon for short term stability. It should also be noted that the control circuits for double traverse and for coding are not in the main system loop in which timing stability is essential, but these control circuits are separate and distinct therefrom. In a constructed embodiment of the invention, the single traverse time of a station was approximately 62 microseconds which includes 50 microseconds in the precision delay line 17, almost 8 microseconds in the encoder 25, and miscellaneous other delays.

The invention provides, therefore, a system that depends primarily upon short term stability which can be attained to a high degree for precise measurements. Long time period variations are inconsequential in the present system because algebraic cancellation of station traverse time is made on a short time basis. The basic timing pulse loop is simpler than in previous systems and is free from variable elements. The actual value of the station traverse time need not be known in the present system, and this time is therefore chosen for best electronic accuracy rather than for arithmetical convenience. Moreover, due to the latter factor, there is no need to determine station traverse time or to have the actual air time subject to the errors inherent in such station traverse time determination.

We claim:

1. Apparatus for use in a distance measuring system, which system comprises first and second stations between which a timing signal successively coded in one of two coding modes is reciprocated, said apparatus including in combination, means for receiving the coded timing signal, a decoder coupled to said receiving means and adapted to accept the timing signal only when coded in a selected one of its two coding modes, an encoder coupled to said decoder and having a first condition for imparting first mode coding to said timing signal from said decoder and having a second condition for imparting second mode coding to said timing signal from said decoder, a control means for actuating said encoder from said first to said second position to cause said encoder successively to code said timing signal in said first mode and in said second mode, and transmitting means coupled to said encoder for transmitting the coded timing signal.

2. Apparatus for use in a distance measuring system, which system comprises first and second stations between which a timing pulse and a keying pulse successively coded in one of two coding modes are reciprocated, said apparatus including in combination, means for receiving the coded timing and keying pulses, a decoder coupled to said receiving means and adapted to accept the timing pulse only when coded with the keying pulse in a selected one of the two coding modes, an encoder coupled to said decoder and having a first condition for producing a keying pulse timed to produce first mode coding with the timing pulse, and said encoder having a second condition for producing a keying pulse time to produce second mode coding with the timing pulse, control means for said encoder responsive to said timing pulse from said decoder for actuating said encoder from said first to said second position to cause said encoder alternately to produce said keying pulses in said first coding mode and in said second coding mode, and transmitting means coupled to said encoder for transmitting the coded keying and timing pulses.

3. Apparatus for use in a distance measuring system, which system comprises first and second stations between which a timing pulse and a keying pulse alternately coded to have a first selected timing therebetween and a second selected timing therebetween are reciprocated, said apparatus including in combination, means for receiving the timing and keying pulses, a decoder coupled to said receiving means and adapted to accept the timing pulse only when it has said first selected timing with the keying pulse, an encoder coupled to said decoder for translating said timing pulse and for producing keying pulses having said first and said second timing with the timing pulse, control means responsive to said timing pulse from said decoder for causing said encoder to produce keying pulses having alternately said first selected timing and said second selected timing with the timing pulse, and transmitting means coupled to said encoder for transmitting the keying and timing pulses therefrom.

4. Apparatus for measuring the distance between a first station and a second station including means at said first station for transmitting an electrical pulse, means at the second station for receiving the pulse and for circulating the pulse once through the second station, transmitting means at the second station for transmitting the circulated pulse to the first station, means at the first station for receiving the pulse from the second station and for circulating the pulse once through the first station, control means at said first and second stations for selectively circulating and transmitting pulses therefrom, and means at one of said stations for comparing the time interval between the reception of pulses thereat with selective circulation of pulses through the stations to thereby determine the distance between said stations.

5. Apparatus for measuring the distance between a first station and a second station which includes means at each station for transmitting signals in first and second coded relations, said means including selective means for controlling the coded relation of signals transmitted thereby, receiving means at said first station responsive to signals having said first coded relation, receiving means at said second station responsive to signals having said second coded relation, said selective means at each station being operable in a first condition to retransmit the signals with the same code as received so that such signals are again received by the same station, and said selective means also being operable in a second condition to retransmit such signals with a change in the code thereof so that such signals are received by the other station, whereby the signals are selectively circulated through each station prior to transmission to the other station, and means at one of said stations for comparing the time interval between reception of signals at said one station with selective circulation of the signals through the stations, to thereby determine the distance between said stations.

6. Apparatus for measuring the distance between a first station and a second station which includes means at each station for transmitting keying and timing pulses having first and second timed relations therebetween, said means including selective means for controlling the timed relation of pulses transmitted thereby, receiving means at said first station responsive to keying and timing pulses having said first timed relation, receiving means at said second station responsive to keying and timing pulses having said second timed relation, said selective means at each station being operable in a first condition to retransmit the keying and timing pulses with the same relation as received so that such pulses are again received by the same station, and said selective means also being operable in a second condition to retransmit such pulses with a change in the timed relation therebetween so that such pulses are received by the other station, whereby the pulses are selectively circulated through each station prior to transmission to the other station, and means at one of said stations for comparing the time interval between reception of pulses at said one station with selective circulation of the pulses through the stations, to thereby determine the distance between said stations.

7. Apparatus for measuring the distance between a first station and a second station, including in combination, means at the first station for transmitting a signal, means at the second station for receiving the signal and for circulating the signal at least once through the second station, transmitting means at the second station for transmitting the circulated signal to the first station, means at the first station for receiving the signal from the second station and for circulating the received signal through the first station the same number of times as at the second station, control means at the first and second stations for selectively circulating and transmitting signals therefrom and for establishing first and second cycles during which the signal is circulated different numbers of times, and timing means at one of the stations for measuring the time interval between predetermined points in said first and second cycles to thereby determine the distance between the stations.

8. Apparatus as defined in claim 7 wherein said control means is operable to provide a first number of the first cycles during which the signal is circulated once at each station, said control means further being operable to provide a second number, equal to one-half said first number, of second cycles during which the signal is circulated twice at each station, and said timing means determines the distance between the first and second stations from the difference in time required for said first number of first cycles and for said second number of second cycles.

References Cited in the file of this patent
UNITED STATES PATENTS
2,648,060     Turner _____ Aug. 4, 1953